(12) United States Patent
Kumagai

(10) Patent No.: US 11,313,680 B2
(45) Date of Patent: Apr. 26, 2022

(54) POSITIONING DEVICE, POSITIONING METHOD, AND PROGRAM

(71) Applicant: Topcon Corporation, Tokyo (JP)

(72) Inventor: Kaoru Kumagai, Tokyo (JP)

(73) Assignee: Topcon Corporation, Tokyo (JP)

( * ) Notice: Subject to any disclaimer, the term of this patent is extended or adjusted under 35 U.S.C. 154(b) by 123 days.

(21) Appl. No.: 16/852,915

(22) Filed: Apr. 20, 2020

(65) Prior Publication Data
US 2020/0340811 A1    Oct. 29, 2020

(30) Foreign Application Priority Data

Apr. 24, 2019  (JP) .............................. JP2019-082941

(51) Int. Cl.
*G01C 15/00* (2006.01)
*G01C 15/06* (2006.01)

(52) U.S. Cl.
CPC ........... *G01C 15/006* (2013.01); *G01C 15/06* (2013.01)

(58) Field of Classification Search
CPC ...... G01C 15/006; G01C 15/06; G01C 15/02; G01C 15/00; G01S 17/66; G01S 17/08; G01S 17/42
See application file for complete search history.

(56) References Cited

U.S. PATENT DOCUMENTS

| | | | | |
|---|---|---|---|---|
| 3,970,959 A | * | 7/1976 | Wang .................... | H01S 3/0635 372/96 |
| 4,084,907 A | * | 4/1978 | Pinard ................... | G01J 9/0246 250/550 |
| 5,042,041 A | * | 8/1991 | Vry ....................... | H01S 5/06213 372/28 |
| 5,285,309 A | * | 2/1994 | Endoh ..................... | G02F 1/37 359/328 |
| 6,603,778 B1 | * | 8/2003 | Imasaka ................... | H01S 3/30 372/22 |
| 7,496,025 B2 | * | 2/2009 | Isshiki ................... | B82Y 20/00 369/121 |
| 7,664,158 B2 | * | 2/2010 | Kiyota ................... | B82Y 20/00 372/96 |
| 8,284,814 B2 | * | 10/2012 | Noda ....................... | H01S 5/10 372/96 |

(Continued)

FOREIGN PATENT DOCUMENTS

JP    2017-133981 A    8/2017

*Primary Examiner* — Tung S Lau
(74) *Attorney, Agent, or Firm* — Chiesa Shaninian & Giantomasi PC

(57) ABSTRACT

A technique for calculating charge in accordance with a state of use of a user in a rental business of total stations is provided. A total station includes a positioning unit, an operation receiving unit, a positioning mode selector, and a counter. The positioning unit performs positioning by using pulsed laser light. The operation receiving unit receives operation of a user. The positioning mode selector selects one of a first positioning mode and a second positioning mode on the basis of operation of the user to the operation receiving unit. In the first positioning mode, positioning is performed at a specific point at a relatively small laser wave number. In the second positioning mode, positioning is performed at a specific point at a relatively large laser wave number. The counter counts up each of the selected times of the first positioning mode and the second positioning mode.

5 Claims, 2 Drawing Sheets

(56) References Cited

U.S. PATENT DOCUMENTS

| | | | |
|---|---|---|---|
| 8,797,542 B2* | 8/2014 | Tokimitsu | G01B 9/02027 |
| | | | 356/486 |
| 9,134,246 B2* | 9/2015 | Naito | G02B 21/365 |
| 2003/0095494 A1* | 5/2003 | Isshiki | B82Y 20/00 |
| | | | 369/121 |
| 2009/0074024 A1* | 3/2009 | Noda | H01S 5/10 |
| | | | 372/50.12 |
| 2009/0168634 A1* | 7/2009 | Isshiki | G11B 7/127 |
| | | | 369/121 |
| 2011/0235163 A1* | 9/2011 | Ishihara | G02F 1/3775 |
| | | | 359/328 |

* cited by examiner

POSITIONING DEVICE, POSITIONING METHOD, AND PROGRAM

CROSS-REFERENCE TO RELATED APPLICATIONS

This application claims the benefit of priority from Japanese Patent Application Serial No. 2019-082941, filed Apr. 24, 2019, the disclosure of which is incorporated herein by reference in its entirety.

TECHNICAL FIELD

The present disclosure relates to a technique for measuring location.

BACKGROUND

Techniques for performing positioning or measuring of a location by using a total station are publicly known. Such a technique is disclosed in, for example, Japanese Unexamined Patent Application Laid-Open No. 2017-133981.

SUMMARY

A total station may be rented in some cases. In these cases, for example, the rental charges are calculated on a weekly basis. However, this method for calculating the charges may not correspond to the state of use of a user. In view of these circumstances, an object of the present disclosure is to provide a technique for calculating charges in accordance with a state of use of a user in a rental business of total stations.

The present disclosure provides a positioning device including a processor or circuitry configured to perform positioning by using laser light and to select one of a first positioning mode and a second positioning mode. The first positioning mode causes positioning to be performed at a specific point at a relatively small laser wave number. The second positioning mode causes positioning to be performed at a specific point at a relatively large laser wave number. This processor or circuitry is further configured to count up selected times of the first positioning mode and selected times of the second positioning mode.

The present disclosure can also be understood as a positioning method for performing positioning by using laser light. The positioning method includes selecting one of a first positioning mode and a second positioning mode. The first positioning mode causes positioning to be performed at a specific point at a relatively small laser wave number. The second positioning mode causes positioning to be performed at a specific point at a relatively large laser wave number. The positioning method also includes counting up selected times of the first positioning mode and selected times of the second positioning mode.

The present disclosure can also be understood as a non-transitory computer recording medium storing computer executable instructions for performing positioning by using laser light. The computer executable instructions are made to, when executed by a computer processor, cause the computer processor to select one of a first positioning mode and a second positioning mode. The first positioning mode causes positioning to be performed at a specific point at a relatively small laser wave number. The second positioning mode causes positioning to be performed at a specific point at a relatively large laser wave number. The computer executable instructions are made to, when executed by the computer processor, also cause the computer processor to count up selected times of the first positioning mode and selected times of the second positioning mode.

In one aspect of the present disclosure, the positioning device may further include a processor or circuitry configured to transmit the counted selected times of the first positioning mode and the second positioning mode to a management server.

The present disclosure can also be understood as a positioning device including a processor or circuitry configured to perform positioning by using laser light and to select one of a first positioning mode and a second positioning mode. The first positioning mode causes positioning to be performed at a specific point at a relatively small laser wave number. The second positioning mode causes positioning to be performed at a specific point at a relatively large laser wave number. This processor or circuitry is further configured to transmit information of the mode that is selected between the first positioning mode and the second positioning mode and to transmit data of the positioning, to a management server.

The present disclosure provides a technique for calculating charges in accordance with a state of use of a user in a rental business of total stations.

DETAILED DESCRIPTION

1. Embodiment

Outline

Figure 1:
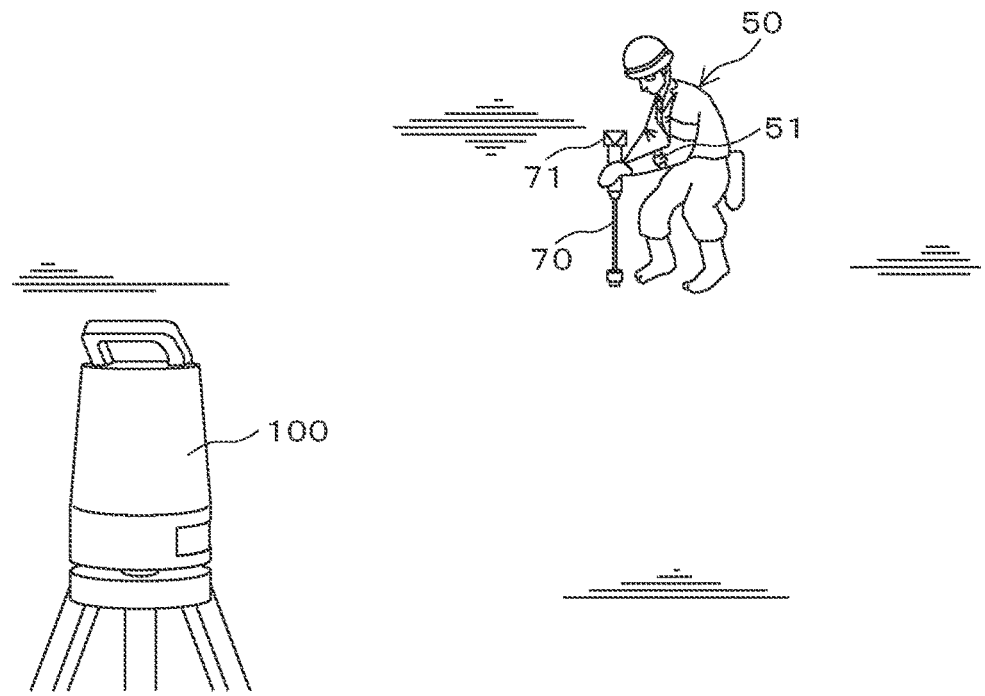
FIG. 1 is a schematic diagram showing an example of survey point setting work.

FIG. 1 shows an example of survey point setting work. The survey point setting work is performed at a civil engineering site or other site, and involves identifying a location that is specified in a plan, at an actual site, and marking the identified location by, for example, pile-driving. This work uses a total station 100. In this embodiment, the total station 100 is a rental device, and therefore, a rental charge in accordance with the use state is charged to a user of the total station 100 by a rental dealer.

In order to set a survey setting point, a user or operator 50 grasps a surveying pole 70 with a reflection prism 71 that is a target of laser positioning and carries a terminal 51 for displaying guide information relating to the survey point setting work. The reflection prism 71 reflects incident light back by 180 degrees. The terminal 51 includes a communication interface, an operation interface, and a display. The terminal 51 is implemented by a dedicated terminal or a smartphone or by a tablet terminal that is installed with application software for performing a guide function.

In the survey point setting work, a survey setting point that is specified in a plan in advance is determined by using a positioning function of the total station 100, and, for example, pile-driving is performed at the determined survey setting point. The determination of the survey setting point is performed by using the surveying pole 70 with the reflection prism 71 as well as the total station 100.

Figure 2:
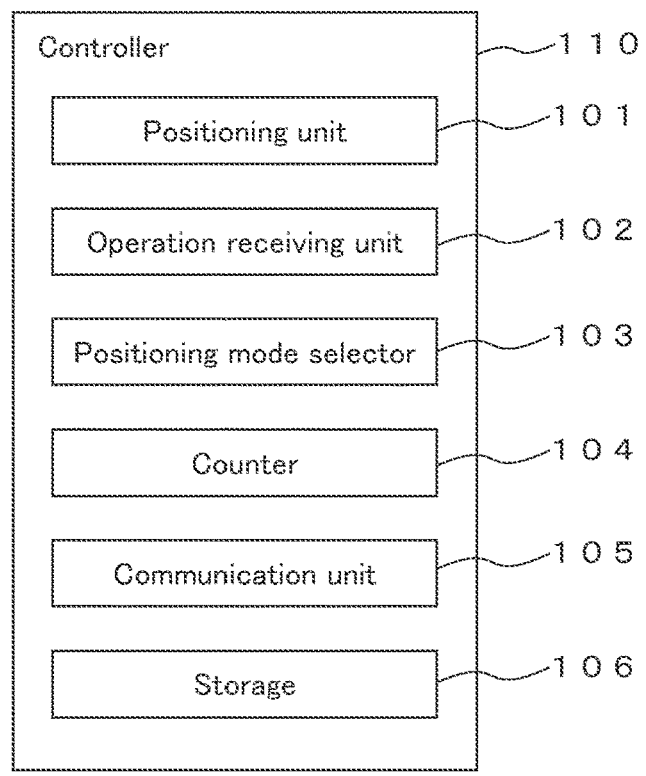
FIG. 2 is a block diagram of a controller of a total station of an embodiment.

The total station 100 includes a controller 110 shown in FIG. 2. The controller 110 includes a positioning unit 101, an operation receiving unit 102, a positioning mode selector 103, and a counter 104. The positioning unit 101 performs positioning by using laser light. The operation receiving unit 102 receives operation of the user 50. The positioning mode selector 103 selects one of a first positioning mode and a second positioning mode on the basis of operation of the user 50 to the operation receiving unit 102. In the first positioning mode, positioning is performed at a specific point at a relatively small laser wave number. In the second positioning mode, positioning is performed at a specific point at a relatively large laser wave number. The counter 104 counts up each of the selected times of the first positioning mode and the second positioning mode. Herein, the laser wave number means a number of pulses of laser light in a distance measurement method, a number relating to one cycle in a phase difference method, or a number relating to a measured number or a measurement period of laser beams that are reflected back in a method using both of the distance measurement method and the phase difference method.

The performance necessary for the total station 100 to perform the first positioning mode differs from the performance necessary for the total station 100 to perform the second positioning mode. Specifically, the second positioning mode requires higher performance than the first positioning mode. In general, a precision apparatus with higher performance tends to increase its development cost and its manufacturing cost accordingly, thereby being expensive.

In consideration of this, weights are assigned in accordance with the required performances and are reflected in the rental charge in using a rental total station. This enables charging in accordance with the state of use of a user. Specifically, using a relatively high cost function results in relatively high charges, whereas using a relatively low cost function results in relatively low charges.

In this method, charges are relatively low when using a low cost function, and charges are relatively high when using a high cost function. This charging method reflects the value of the function that is used, and thus corresponds to the state of use of a user.

Total Station

The optical function of the total station 100 is the same as that of an ordinary total station. Exterior orientation parameters (location and attitude) in an absolute coordinate system of the total station 100 are preliminarily measured in a state in which the total station 100 is installed at the actual site, and these exterior orientation parameters are obtained as known data. The absolute coordinate system is a coordinate system used in a GNSS or a map, and normally, coordinates are determined in terms of latitude, longitude, and altitude. An appropriate local coordinate system can also be used as the coordinate system. The total station 100 acquires coordinates of survey setting points in advance and stores these coordinates in its storage.

The total station (TS) 100 is configured to search for the reflection prism 71 by using laser light or by performing image recognition processing on photographic images taken by a camera. The total station 100 is further configured to perform positioning of the reflection prism 71 by using laser light. The total station 100 emits distance measurement laser light to the reflection prism 71 and measures location of the reflection prism 71 relative to the total station 100 by using the distance measurement laser light that is reflected back.

Block Diagram of Total Station

The total station 100 emits the distance measurement light in a pulse cycle of 50 times per second, to an object to be positioned. The number of pulses to be used can be selected. Each pulsed light is high-frequency-modulated, and a distance is measured from a phase difference between the distance measurement light that has reflected back from the object and reference light that has propagated through a reference optical path. The direction of a reflection point of the distance measurement light as seen from an optical origin of the total station 100 is known from the direction of the optical axis at the time the total station 100 emits the distance measurement light. Then, location of the reflection point of the distance measurement light relative to the total station 100 is calculated from the distance and the direction of the reflection point as seen from the total station 100. Alternatively or additionally, the distance can be measured from a time of flight of the pulsed distance measurement light. Although the total station performs distance measurement by employing a pulse method that uses pulsed distance measurement light, in this embodiment, the distance measurement can be performed by a phase difference method that uses light-intensity modulated light or by a combination of these methods.

FIG. 2 shows a block diagram of the controller 110 of the total station 100. The configurations of the optical system and the mechanism system are the same as those of an ordinary total station, and therefore, descriptions thereof are omitted. The controller 110 functions as a computer. The controller 110 includes a CPU, a memory, an interface circuit, various kinds of processors, and various kinds of integrated circuits. One or more or all of the components of the controller 110 can be constructed of a microcomputer or a dedicated processor using, e.g. an FPGA. One or more of the components of the controller 110 can also be understood to be a program that is executed by a CPU.

The controller 110 includes the positioning unit 101, the operation receiving unit 102, the positioning mode selector 103, the counter 104, a communication unit 105, and a storage 106.

The positioning unit 101 calculates location of a reflection point of the distance measurement light. The total station 100 contains a reference optical path. The pulsed distance measurement light to be emitted to the object to be positioned is partially split, and this split light is conducted to the reference optical path as reference pulsed light. The distance measurement light that is reflected back from the object to be positioned, which is measurement pulsed light, is measured by a measuring element such as a photodiode. The measuring element measures the reference pulsed light and the measurement pulsed light.

The measurement pulsed light propagates a path that is longer than the path for the reference pulsed light, and thus, a phase difference is generated due to measuring timings of the measurement pulsed light and the reference pulsed light. This phase difference is used to calculate a distance to the reflection point of the distance measurement light. In addition, the direction of the optical axis of the distance measurement light is measured by a horizontal rotation angle measuring sensor and a vertical angle measuring sensor that are mounted to the total station 100. The vertical angle includes an elevation angle and a depression angle. On the condition that the distance and the direction of the reflection point of the distance measurement light from the total station 100 are determined, location of the reflection point relative to the total station 100 is calculated.

The exterior orientation parameters of the total station 100 in a specific coordinate system to be used, e.g. an absolute coordinate system, are examined in advance and are already known. In this state, after location of the reflection point relative to the total station 100 is determined, location in terms of three-dimensional coordinate values of the reflection point in the absolute coordinate system is calculated. The above processes are performed by the positioning unit 101.

The operation receiving unit 102 receives the content of operations performed at the total station 100 by the user 50. In this embodiment, the user 50 operates the total station 100 by use of the terminal 51 that the user 50 carries. When the user 50 operates the total station 100 by use of the terminal 51, a signal for instructing this operation is sent from the terminal 51 to the total station 100 and is received by the operation receiving unit 102.

The positioning mode selector 103 selects a positioning mode that is designated by the user 50. In this embodiment, two kinds of positioning modes, that is, a first positioning mode and a second positioning mode, are prepared, as described later, and either one is selected. Of course, the positioning mode can be switched at any timing. Specifically, in response to operation of the terminal 51 by the user 50, the first positioning mode or the second positioning mode is selected. The content of this selection is received by the operation receiving unit 102, and the positioning mode is selected by the positioning mode selector 103 based on the received content.

The counter 104 counts up the selection of the positioning mode. There are several counting methods. In one example, selection of the positioning mode is counted, and the counted result is sent from the communication unit 105 to the management server 200, each time the positioning mode is selected. In another example, an accumulation value of the counted values of selection of the positioning mode is sent from the communication unit 105 to the management server 200 at a time at the stage of completion of work. In yet another example, an accumulation value of the counted values of selection of the positioning mode is sent from the communication unit 105 to the management server 200 several times during the work.

The communication unit 105 communicates with the terminal 51. The communication is made by using a telephone line, a wireless LAN line, a Bluetooth (registered trademark) line, or other manner. The communication unit 105 is able to connect with an internet line to communicate with the management server 200 in FIG. 3. Positioning data that is obtained by the total station 100 as well as data relating to the use state of the positioning mode are sent from the communication unit 105 to the management server 200.

The storage 106 is composed of a semiconductor memory or a hard disk drive and stores various kinds of data and programs necessary to operate the total station 100 and various kinds of data obtained as a result of operating the total station 100.

Details of Positioning Modes
First Positioning Mode

In the first positioning mode, distance is measured by using an average of three pulses of the distance measurement light in order to enable positioning even when an object to be positioned moves. Using a small number of pulses enhances tracking ability to the movement of the object to be positioned but decreases positioning accuracy. Conversely, using a large number of pulses decreases the tracking ability of the movement of the object to be positioned, but enhances the positioning accuracy. The above conditions are set in consideration these positive and negative effects. The number of pulses used in the first positioning mode is not limited to that in the above-described example and can be appropriately set in accordance with performance of the device and the positioning situation.

Second Positioning Mode

In the second positioning mode, distance is measured by using an average of ten pulses of the distance measurement light in order to increase positioning accuracy. The number of pulses used in the second positioning mode is not limited to that in the above-described example and can be appropriately set in accordance with performance of the device and the positioning situation.

Management Server

Figure 3:
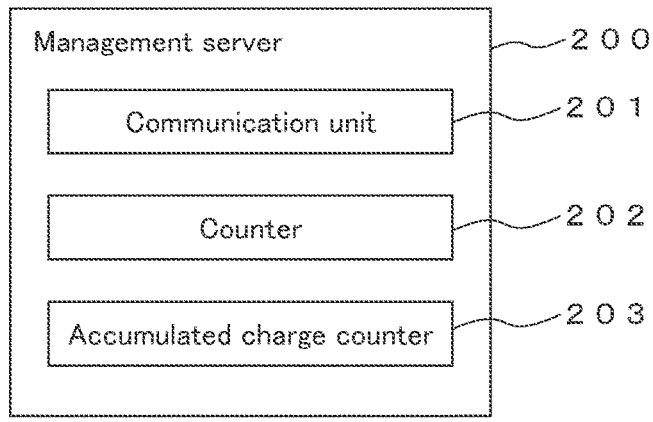
FIG. 3 is a block diagram of a management server of the embodiment.

FIG. 3 is a block diagram of the management server 200. The management server 200 performs processing relating to charging in accordance with the use state of the total station 100. The management server 200 communicates with the total station 100 via an internet line. The management server 200 includes a communication unit 201, a counter 202, and an accumulated charge calculator 203. The communication unit 201 is configured to connect with an internet line to communicate with the total station 100. The communication partner is not limited to the total station 100, and communication can be made with the terminal 51 and other electronic devices.

The counter 202 individually counts up the selected times of the first positioning mode and the second positioning mode, which are performed by the total station 100. The counter 202 increments the selected time of the positioning mode by one when the corresponding positioning mode is selected. Thus, a measurement time period for performing the selected positioning mode is not considered. Of course, a time element can be used as desired.

For example, it is assumed that ten survey setting points are to be set. In this case, the first positioning mode is selected ten times in order to perform guiding operation to the ten survey setting points. Moreover, the second positioning mode is selected ten times in order to determine the ten survey setting points by means of pile-driving. In some cases, these operations may fail and be performed again, and each of the first positioning mode and the second positioning mode may be selected eleven or more times. However, to provide a simple explanation, it is assumed that each of these modes is selected ten times.

The use frequency of each of the positioning modes is sent from the total station 100 to the management server 200 and is received by the counter 202. At this time, positioning data obtained by the total station 100 is also sent to the management server 200.

In the above-described example, a signal showing that the first positioning mode is selected ten times and the second positioning mode is selected ten times is sent from the total station 100 to the management server 200. Then, the counter 202 of the management server 200 counts the use frequency of each of the first positioning mode and the second positioning mode and recognizes that the first positioning mode is selected ten times and the second positioning mode is selected ten times.

The accumulated charge calculator 203 charges in accordance with the use frequencies of the first positioning mode and the second positioning mode that are counted by the counter 202. On the basis of the result of charging, processing for billing the user for use charges of the total station 100 and processing for withdrawing the use charges are performed.

For example, it is assumed that the use charges of the first positioning mode is 500 yen per one selection and the use charge of the second positioning mode is 1,500 yen per one selection. In these conditions, the use frequency of the first positioning mode may be 250 times, and the use frequency of the second positioning mode may be 230 times. In this case, (500 yen×250 times)+(1,500 yen×230 times)=470,000 yen is charged, and this amount is billed to the user.

Example of Survey Point Setting Work

The following describes an overview of the survey point setting work. First, the total station 100 is set to the first positioning mode. This setting is performed through the terminal 51 operated by the user 50.

The user 50 carries a plan in which locations of survey setting points and the order of setting the survey setting points are described, and the user 50 approaches a first survey setting point by referring to the plan. This plan can be displayed on a display screen of the terminal 51. On the other hand, the order of setting the survey setting points is stored also in the total station 100 in advance, and searching for a target, in this case, the reflection prism 71, near the first survey setting point is started at the time the user approaches the first survey setting point. Specifically, the user 50 operates the terminal 51 to instruct the total station 100 to start the processing, whereby the searching is started.

While approaching the survey setting point, the user 50 carries the surveying pole 70 while holding it vertically. When the user 50 comes close to the first survey setting point, the total station 100 captures and locks on the reflection prism 71 and then performs positioning to the reflection prism 71 in the first positioning mode. The positioning of the reflection prism 71 is continuously performed, and positioning data of the reflection prism 71 is successively obtained unless otherwise instructed.

After the total station 100 performs positioning to the reflection prism 71, data of this positioning and data of the first survey setting point are sent to the terminal 51. In response to this, the terminal 51 displays a location relationship between the location of the reflection prism 71 and the predetermined survey setting point in the manner of a radar scope. Specifically, the display of the terminal 51 shows a screen in which the two-dimensional location of the reflection prism 71 is displayed at the center and the two-dimensional location of the survey setting point is also displayed relative to this center.

The user 50 can adjust the location of the surveying pole 70 in such a manner that the two-dimensional location of the reflection prism 71 coincides with the two-dimensional location of the survey setting point, by referring to the display of the terminal 51. After the location of the reflection prism 71 coincides or appears to coincide with the location of the survey setting point, or more exactly, coordinates in a plane coordinate system of the reflection prism 71 coincide or appear to coincide with those of the survey setting point, the mode is switched to the second positioning mode, and the location at which the reflection prism 71 exists is determined as the survey setting point.

After the survey setting point is determined, marking to drive a pile as a mark or driving a pile as a mark is performed. In this work, the first positioning mode and the second positioning mode are selected once each. The above described work is performed to each of a second survey setting point, a third survey setting point, and the rest of the survey setting points.

Processing of Total Station

Figure 4:
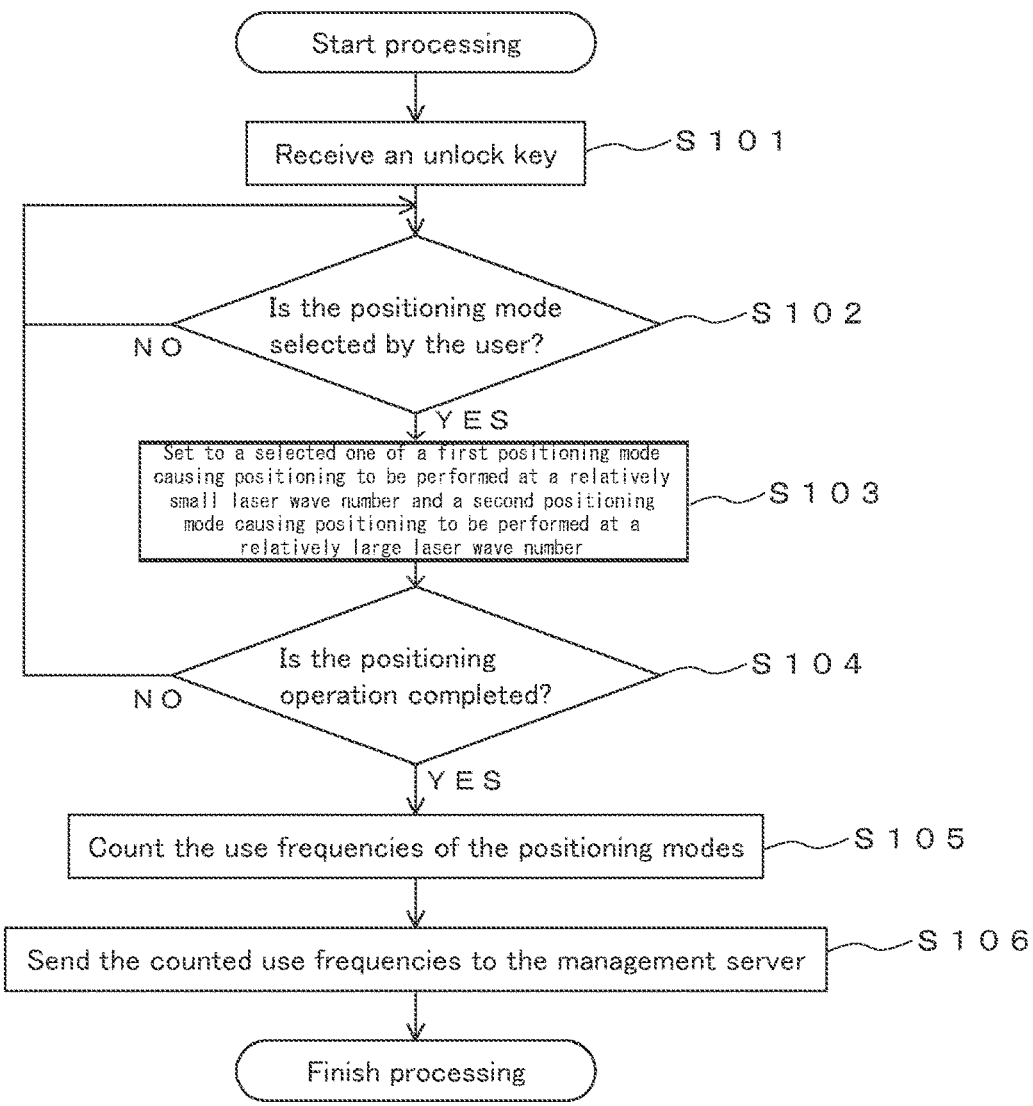
FIG. 4 is a flowchart showing an example of a processing procedure in the embodiment.

The following describes an example of processing performed by the total station 100 in the survey point setting work. FIG. 4 is a flowchart showing an example of a processing procedure. The processing in FIG. 4 can also be performed by a control device that is externally provided to the total station 100, for example, a PC used as a control computer. The program for executing the processing in FIG. 4 is stored in the storage 106 and is executed by the controller 110. This program can be stored in an appropriate storage medium or an appropriate server and can be used by downloading it therefrom to the controller 110.

It is assumed that the total station 100 is configured to be usable when an unlock key that is provided by a rental dealer is input thereinto. When the total station 100 is turned on, and the unlock key that is provided to the user 50 is input thereinto (step S101), the processing in step S102 and the subsequent steps starts.

After the processing starts, whether the positioning mode is selected by the user 50 is determined (step S102). The selection of the positioning mode is performed through the terminal 51 operated by the user 50.

After the user 50 selects the positioning mode, the selected positioning mode is set (step S103). For example, a command for instructing execution of a positioning mode is prepared, and the positioning mode is distinguished from another positioning mode by recognizing the corresponding command. When the selected positioning mode is distinguished from another positioning mode, this positioning mode is set, and the subsequent positioning operation is performed in this selected positioning mode.

Next, whether the positioning operation of the total station 100 is completed is determined (step S104). For example, in the case in which the survey point setting work with respect to all survey setting points that are planned to be set is completed, the user 50 inputs information showing completion of the work, to the terminal 51. The input information is sent to the total station 100, and whether the work is completed is recognized by the total station 100. Alternatively, at the stage in which the survey point setting work with respect to all survey setting points that are planned to be set is completed, the completion is automatically recognized, and it is determined that the work is completed.

In the case in which the total station 100 completes the operation, the processing advances to step S105. In the case in which the operation is not completed, the processing in step S102 and the subsequent steps is repeated. In step S105, the use frequencies of the first positioning mode and the second positioning mode that have been used until the operation is completed are counted (step S105). For example, the counting result is such that the use frequency of the first positioning mode is 30 times and the use frequency of the second positioning mode is 34 times. Thereafter, the count data of the positioning modes, which are obtained in step S105, and the positioning data are sent to the management server 200 (step S106), and the processing in FIG. 4 is finished.

In this flow of the processing procedure, data of the use frequencies of the positioning modes are sent to the management server 200 at a time after the survey point setting work is completed. However, the use state of the positioning mode can be sent to the management server 200 each time the positioning mode is selected.

Other Matters

Switching from the first positioning mode to the second positioning mode can be automatically performed. In this case, at the stage at which the distance between the survey setting point and the reflection prism 71 reaches a predetermined threshold, for example, 5 cm, or less, the first positioning mode is switched to the second positioning mode correspondingly.

The number of the positioning modes is not limited to two and may be three or more. For example, applications of the total station include surveying in a current state, boundary delimitation surveying, measuring location of a construction machine or position of a movable part of a construction machine, such as position of a bucket of a hydraulic excavator, and positioning or tracking of a UAV. In view of this, positioning modes that are suitable for respective applications may be prepared.

In the above example of the embodiment, the positioning modes are set in accordance with the difference in the number of pulses of the distance measurement light to be used. However, the positioning modes can also be set in accordance with other factors. For example, the positioning modes may be set in accordance with a measurement distance.

Moreover, the use charges may be charged by further weighting the positioning mode described in the foregoing embodiment. For example, in a case in which output of the distance measurement light can be changed or output of the distance measurement light can be selected from among multiple output values, the use charges of the positioning mode are increased when high output is selected.

In one example, it is assumed that the basic use charge of the first positioning mode is 500 yen per one selection and the basic use charge of the second positioning mode is 1,500 yen per one selection. It is also assumed that there are a normal power mode and a high power mode for output of the distance measurement light. The high power mode can be used when the intensity of received reflection light, which is the distance measurement light reflected back from an object, is low or an S/N ratio of the received reflection light is low, due to rain, fog, dust, or other factors.

In these conditions, the basic use charges are charged for use in the normal power mode, and use charges for use in the high power mode are increased by 200 yen from the basic use charge, per each selection of the positioning modes. That is, in the case of selecting the high power mode, the use charge of the first positioning mode is 700 yen per one selection, and the use charge of the second positioning mode is 1,700 yen per one selection.

The selection of the output of the distance measurement light is manually performed or automatically performed based on the intensity of measured light.

The present disclosure can be used in surveying techniques.

What is claimed is:

1. A positioning device comprising a processor or circuitry configured to:
   perform positioning by using laser light;
   select one of a first positioning mode and a second positioning mode, the first positioning mode causing positioning to be performed at a specific point at a relatively small laser wave number, the second positioning mode causing positioning to be performed at a specific point at a relatively large laser wave number; and
   count up selected times of the first positioning mode and selected times of the second positioning mode.

2. A positioning method for performing positioning by using laser light, the positioning method comprising:
   selecting one of a first positioning mode and a second positioning mode, the first positioning mode causing positioning to be performed at a specific point at a relatively small laser wave number, the second positioning mode causing positioning to be performed at a specific point at a relatively large laser wave number; and
   counting up selected times of the first positioning mode and selected times of the second positioning mode.

3. A non-transitory computer recording medium storing computer executable instructions for performing positioning by using laser light, the computer executable instructions made to, when executed by a computer processor, cause the computer processor to:
   select one of a first positioning mode and a second positioning mode, the first positioning mode causing positioning to be performed at a specific point at a relatively small laser wave number, the second positioning mode causing positioning to be performed at a specific point at a relatively large laser wave number; and
   count up selected times of the first positioning mode and selected times of the second positioning mode.

4. The positioning device according to claim 1, further comprising a processor or circuitry configured to transmit the counted selected times of the first positioning mode and the second positioning mode to a management server.

5. A positioning device comprising a processor or circuitry configured to:
   perform positioning by using laser light;
   select one of a first positioning mode and a second positioning mode, the first positioning mode causing positioning to be performed at a specific point at a relatively small laser wave number, the second positioning mode causing positioning to be performed at a specific point at a relatively large laser wave number; and
   transmit information of the mode that is selected between the first positioning mode and the second positioning mode and transmit data of the positioning, to a management server.

* * * * *